United States Patent
Inglis et al.

(10) Patent No.: US 12,468,636 B2
(45) Date of Patent: Nov. 11, 2025

(54) CACHE OPERATION FOR A PERSISTENT STORAGE DEVICE

(71) Applicant: Daedalus Cloud LLC, Croton-on-Hudson, NY (US)

(72) Inventors: Stuart John Inglis, Cambridge (NZ); Cameron Ray Simmonds, Cambridge (NZ); Dmitry Lapik, Cambridge (NZ); Sheridan John Lambert, Cambridge (NZ)

(73) Assignee: Daedalus Cloud LLC, Croton-on-Hudson, NY (US)

( * ) Notice: Subject to any disclaimer, the term of this patent is extended or adjusted under 35 U.S.C. 154(b) by 0 days.

(21) Appl. No.: 17/669,131

(22) Filed: Feb. 10, 2022

(65) Prior Publication Data

US 2022/0261356 A1  Aug. 18, 2022

Related U.S. Application Data

(60) Provisional application No. 63/149,841, filed on Feb. 16, 2021.

(51) Int. Cl.
*G06F 12/123* (2016.01)
*G06F 12/0802* (2016.01)

(52) U.S. Cl.
CPC ........ *G06F 12/123* (2013.01); *G06F 12/0802* (2013.01); *G06F 2212/7201* (2013.01)

(58) Field of Classification Search
CPC .............. G06F 12/123; G06F 12/0802; G06F 2212/7201
See application file for complete search history.

(56) References Cited

U.S. PATENT DOCUMENTS

| | | | |
|---|---|---|---|
| 5,586,291 A | 12/1996 | Lasker et al. | |
| 6,654,855 B1 | 11/2003 | Bopardikar et al. | |
| 6,658,533 B1 | 12/2003 | Bogin et al. | |
| 6,701,393 B1 * | 3/2004 | Kemeny | G06F 12/124 |
| | | | 711/E12.071 |
| 6,889,288 B2 | 5/2005 | Bono et al. | |
| 7,027,064 B2 | 4/2006 | Lavelle et al. | |
| 7,783,836 B2 | 8/2010 | Wang | |
| 8,402,226 B1 * | 3/2013 | Faibish | G06F 12/0804 |
| | | | 711/143 |
| 8,549,230 B1 * | 10/2013 | Chatterjee | G06F 3/0665 |
| | | | 711/170 |
| 9,710,383 B1 * | 7/2017 | Xu | G06F 12/0246 |
| 9,952,973 B2 | 4/2018 | Kamruzzaman | |
| 10,552,325 B2 | 2/2020 | Kamruzzaman | |
| 2004/0107318 A1 * | 6/2004 | Bono | G06F 12/0866 |
| | | | 711/E12.019 |
| 2012/0110247 A1 | 5/2012 | Eleftheriou et al. | |

(Continued)

FOREIGN PATENT DOCUMENTS

EP      3117331 A0      1/2017

OTHER PUBLICATIONS

Jul. 12, 2022—Extended European Search Report—EP 22156693.8.

*Primary Examiner* — Nanci N Wong

(74) *Attorney, Agent, or Firm* — Ascenda Law Group, PC

(57) ABSTRACT

A method comprising: receiving a request to write data to a persistent storage device; writing the data to a cache line of a cache; pushing the cache line onto the end of a least recently used (LRU) queue of cache lines; and reporting the data as having been written to the persistent storage device.

14 Claims, 6 Drawing Sheets

(56) References Cited

U.S. PATENT DOCUMENTS

| | | | |
|---|---|---|---|
| 2017/0091099 A1* | 3/2017 | Greenfield | G06F 12/0811 |
| 2021/0124689 A1* | 4/2021 | Kucherov | G06F 12/0893 |
| 2022/0066886 A1* | 3/2022 | Wang | G06F 11/1469 |

* cited by examiner

CACHE OPERATION FOR A PERSISTENT STORAGE DEVICE

CROSS-REFERENCE TO RELATED APPLICATION

This application claims priority as a non-provisional of U.S. Provisional Patent Application No. 63/149,841, titled "CACHE OPERATION FOR A PERSISTENT STORAGE DEVICE" and filed on Feb. 16, 2021, the disclosure of which is incorporated herein by reference in its entirety.

FIELD

This relates to cache operation for a persistent storage device.

BACKGROUND

Data is stored on a persistent storage device, such as a number of drives. When data is to be written, a storage controller receives the write request and causes the data to be written onto the persistent storage device. When data is to be read, the storage controller receives the read request and returns the data.

SUMMARY

In a first example embodiment, there is provided a method comprising: receiving a request to write data to a persistent storage device; writing the data to a cache line of a cache; pushing the cache line onto the end of a least recently used (LRU) queue of cache lines; and reporting the data as having been written to the persistent storage device.

Preferably, the request to write data comprising an LBA value, and the method further comprises: updating a mapping between LBA values and cache lines.

Preferably, the method further comprises: determining that the LBA value exists in the mapping; determining a cache line corresponding to the LBA value; and updating the cache line to the data of the request.

Preferably, pushing the cache line onto the end of a least recently used (LRU) queue of cache lines comprises: removing the cache line corresponding to the LBA value from the LRU queue; and pushing the cache line corresponding to the LBA value onto the end of the LRU queue.

Preferably, the method further comprises: receiving a request to read data from the persistent storage device; determining that the data is in the cache; and providing the data from the cache.

Preferably, the request to read data comprises an LBA value, and determining that the data is in the cache comprises: determining that the LBA value is in the mapping between LBA values and cache lines.

Preferably, providing the data from the cache comprises: providing the data from the cache line corresponding to the LBA value in the mapping between LBA values and cache lines.

Preferably, the method further comprises: determining that data is to be evicted from the cache; and evicting data from the cache.

Preferably, evicting data from the cache comprises: popping a first cache line from the head of the LRU queue; and writing the data at the first cache line to the persistent storage device.

Preferably, the method further comprises: marking the first cache line as clean.

Preferably, determining that data is to be evicted from the cache comprises: determining that the cache is below a threshold clean capacity.

Preferably, the method further comprises: after writing the data to a cache line of a cache, marking the cache line as dirty.

In a second example embodiment, there is provided a system comprising: one or more processors; and a memory; wherein the memory comprises instructions which, when executed by the one or more processors, configure the one or more processors to perform the method of the first example embodiment.

In a third example embodiment, there is provided a non-transitory computer readable medium comprising instructions which, when executed by one or more processors, cause the one or more processors to perform the method of the first example embodiment.

BRIEF DESCRIPTION

The description is framed by way of example with reference to the drawings which show certain embodiments. However, these drawings are provided for illustration only, and do not exhaustively set out all embodiments.

DETAILED DESCRIPTION

An approach for a storage controller is described which allows the storage controller to handle requests to write data on a persistent storage device. The persistent storage device is a system for storing data in a persistent manner and may comprise a number of drives in different configurations. Before data is stored on the persistent storage device, the storage controller stores the data in a cache. This can allow for writes to be reported as completed once the data is in the cache, even before it is written to the persistent storage device.

The cache has multiple cache lines. Each cache line is a division of the cache which is read and written to in a single unit. Each cache line may have capacity for a predetermined number of pages. A page is a unit of data set by a processor architecture, which may be 4 KiB (that is, 1024 bytes). A cache line might be configured to store 63 pages.

Figure 1:
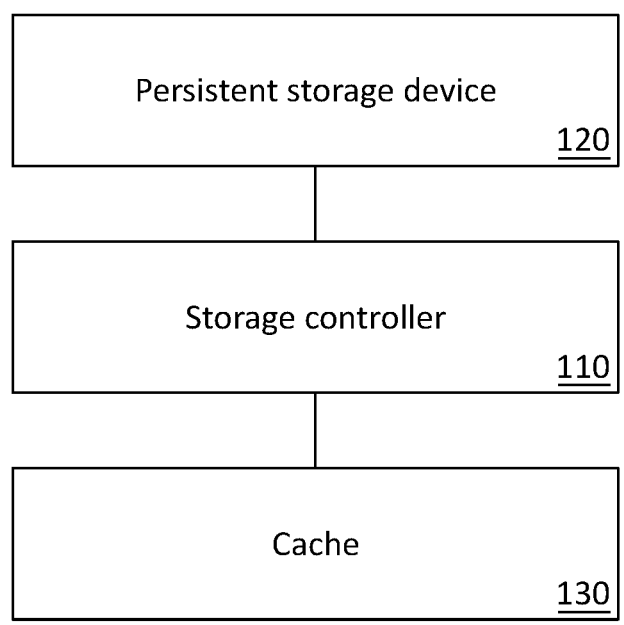
FIG. 1 shows an example storage system.

FIG. 1 shows an example storage system.

The storage controller 110 is in communication with a persistent storage device 120. The persistent storage device 120 is a system for storing data in a persistent manner. Although the persistent storage device is shown as a single component, in practice it generally comprises multiple drives (such as hard disk drives or solid drive drives) arranged into groups and may be distributed over a number of storage nodes. Data is stored across the drives and may have error correcting encoding applied to reduce the risk of data loss if a component of the persistent storage device 120 fails.

Data is stored on the persistent storage devices 120 in blocks. A block is a unit of data of predetermined size, such as 4 KiB (4096 bytes). The storage controller 110 is configured to use logical block addressing (LBA) when receiving requests to interact with the persistent storage device 120. LBA provides that each block of data stored on the persistent storage device 120 is identified by a unique integer LBA value. The storage controller 110 may translate an LBA value to determine which physical location on which drive the data is actually stored on. This translation can allow the storage controller 110 to administer the underlying storage architecture of the persistent storage device 120 freely without external programs being required to record the physical location of the data.

The storage controller 110 is further in communication with a cache 130. The cache comprises non-volatile memory chips configured to operate as a non-volatile cache. This may involve the use of flash memory alone or in combination with conventional volatile memory. The non-volatile memory chips may be configured as non-volatile dual in-line memory modules (NVDIMM).

While the storage controller is described as a single component, in practice the different functions of the storage controller may be split across different entities. For example, interactions with the cache 130 may occur through a cache controller independent of the storage controller 110.

Writing Data

Figure 2:
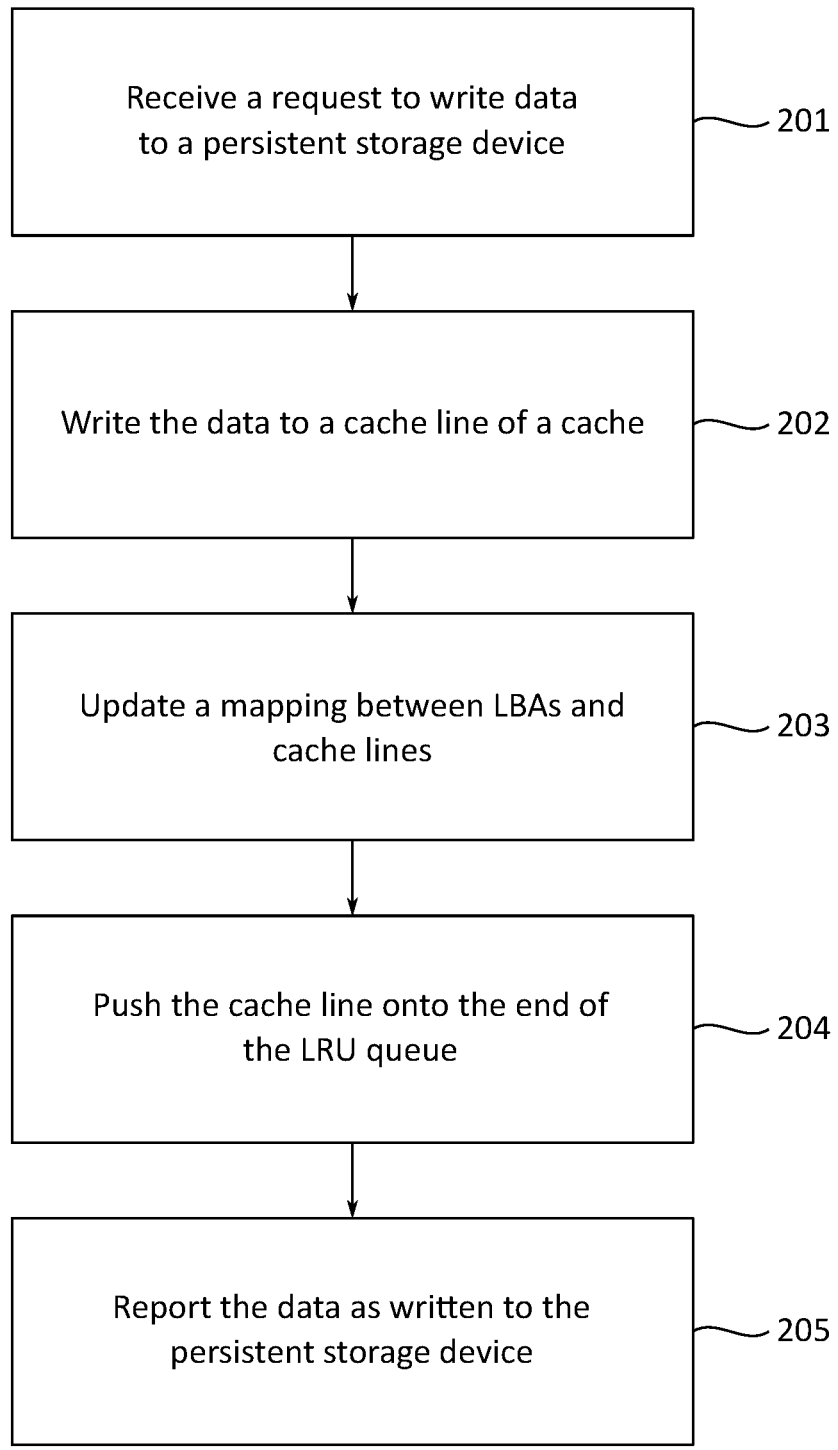
FIG. 2 shows an example approach for writing data.

The storage controller is configured to administer writing data to the persistent storage device. FIG. 2 shows an example approach through which the storage controller can write data.

At step 201, the storage controller receives a request to write data to a persistent storage device.

The request comprises an indication of the data to be stored and a LBA value to indicate where the data should be stored. The request may be in the form of a write instruction from a program running on a processor.

At step 202, the storage controller writes the data to a cache line of the cache.

To achieve this, the storage controller selects a cache line for the data. The cache line may be selected according to a hash of the data to be stored or a function of the virtual address. The storage controller ensures the cache line can store an additional page. Alternatively, the cache line may be selected according to which cache line is clean.

The storage controller stores the data in the selected cache line. The cache line is then marked dirty. This occurs by updating a bit associated with the cache line. This indicates that data has been stored in the cache line but has not yet been written to the persistent storage device.

Where all cache lines are full, data may need to be evicted from the cache before the data is stored in the cache. Eviction is described below with respect to FIG. 3.

At step 203, a mapping between LBAs and cache lines is updated. The mapping records that, for a given cache line, the data should be stored at a given LBA value at the persistent storage device. In addition, if a request for a read from a given LBA is received, it can be provided from the cache (instead of from the persistent storage device). This is described below with respect to FIG. 5.

At step 204, the cache line which was written to is pushed onto the end of an LRU queue. The LRU queue is a queue of the "least recently used" cache lines. The cache line at the end of the queue is the cache line that was most recently written to, and the cache line at the head of the queue is the cache line that was least recently written to. The LRU queue can maintain this ordering without needing to explicitly retain an age of different cache lines.

At step 205, after the storage controller writes the data to the cache, the storage controller reports the data as having been written to the persistent storage device. This occurs even though the data has not actually been written to the persistent storage device, but only remains as a page in the cache.

This provides a benefit of highly responsive write response without the delay that may otherwise occur when writing to a persistent storage device.

Eviction

The storage controller may cause data to be moved from the cache to the persistent storage device. This process is called eviction. Eviction can occur in a number of circumstances.

For example, at step 202, the storage controller writes the data to a cache line of the cache. This requires that the cache is not full. In this context, "not full" means that there is at least one clean cache line in the cache. If the cache line is full, the storage controller may evict data from the cache to allow the storage controller to complete step 202.

Alternatively, the storage controller may pre-emptively evict data to retain a certain level of clean capacity. That is, data may be evicted from the cache so that the cache can store a predetermined quantity of data without eviction. For example, it may be that 50% of the overall capacity of the cache should be retained as clean. This allows for improved burst performance in writing, while still allowing the improved read and modify performance for data already in the cache. Such pre-emptive eviction might only occur when the load on the storage controller is relatively low.

Figure 3:
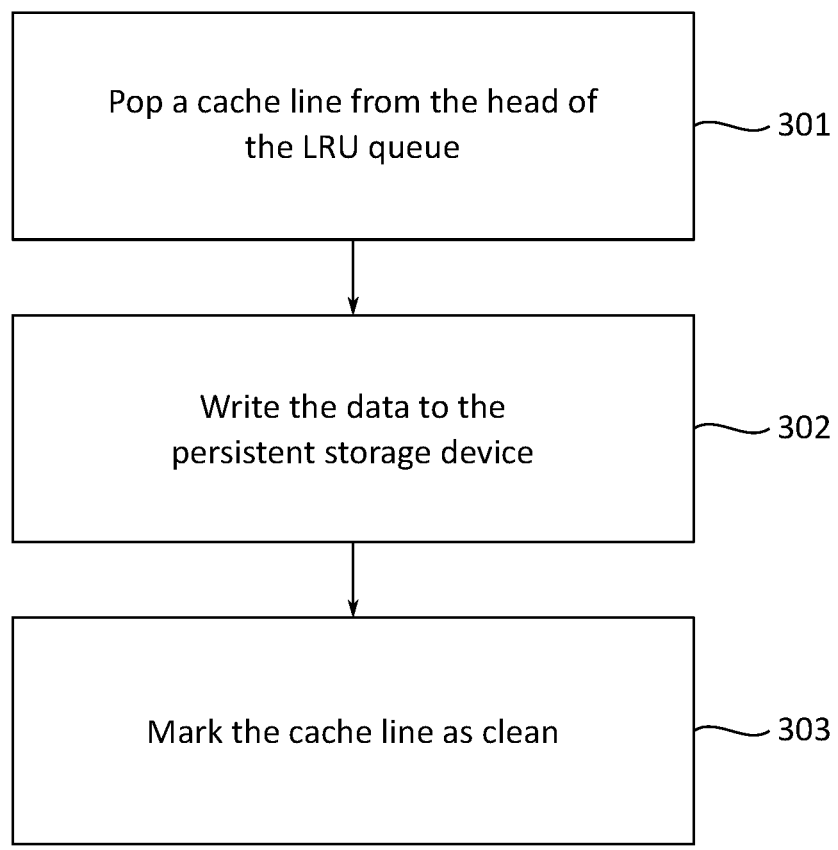
FIG. 3 shows an example approach for evicting data from a cache.

FIG. 3 shows an example approach for evicting data from the cache by writing data to the persistent storage device.

At step 301, the storage controller pops a cache line from the head of the LRU queue. The first item in the LRU queue indicates the cache line which was least recently used for storage of additional data. As a result, the head of the LRU queue becomes the second most least recently used cache line in the queue.

At step 302, the data stored in the cache line is written to the persistent storage device. For each page in the cache line, the storage controller causes the page to be stored according to the corresponding LBA value. This may comprise translating the LBA value to a physical address for one or more of the drives in the persistent storage device. If step 302 fails for any reason, the cache line may be re-added to the head of the LRU queue for a re-attempt at eviction.

The selection of the one or more storage devices may be based on metadata previously stored for the data to be evicted. That is, when the data was initially stored in the cache, metadata may have been updated to map between the cache location of the data and the corresponding LBA value. In such a case, this storage device location may be used to select the one or more storage devices.

At step 303, after the data has been written to the one or more storage devices, the driver marks the corresponding cache line as clean. This allows that part of the cache to be reused. The driver may also update the metadata to show that the data is no longer stored in the cache, for example by removing a mapping between the cache location of the data and the corresponding LBA value.

In this way, data is evicted from the cache to free space in the cache when necessary.

Subsequent Request

Figure 4:
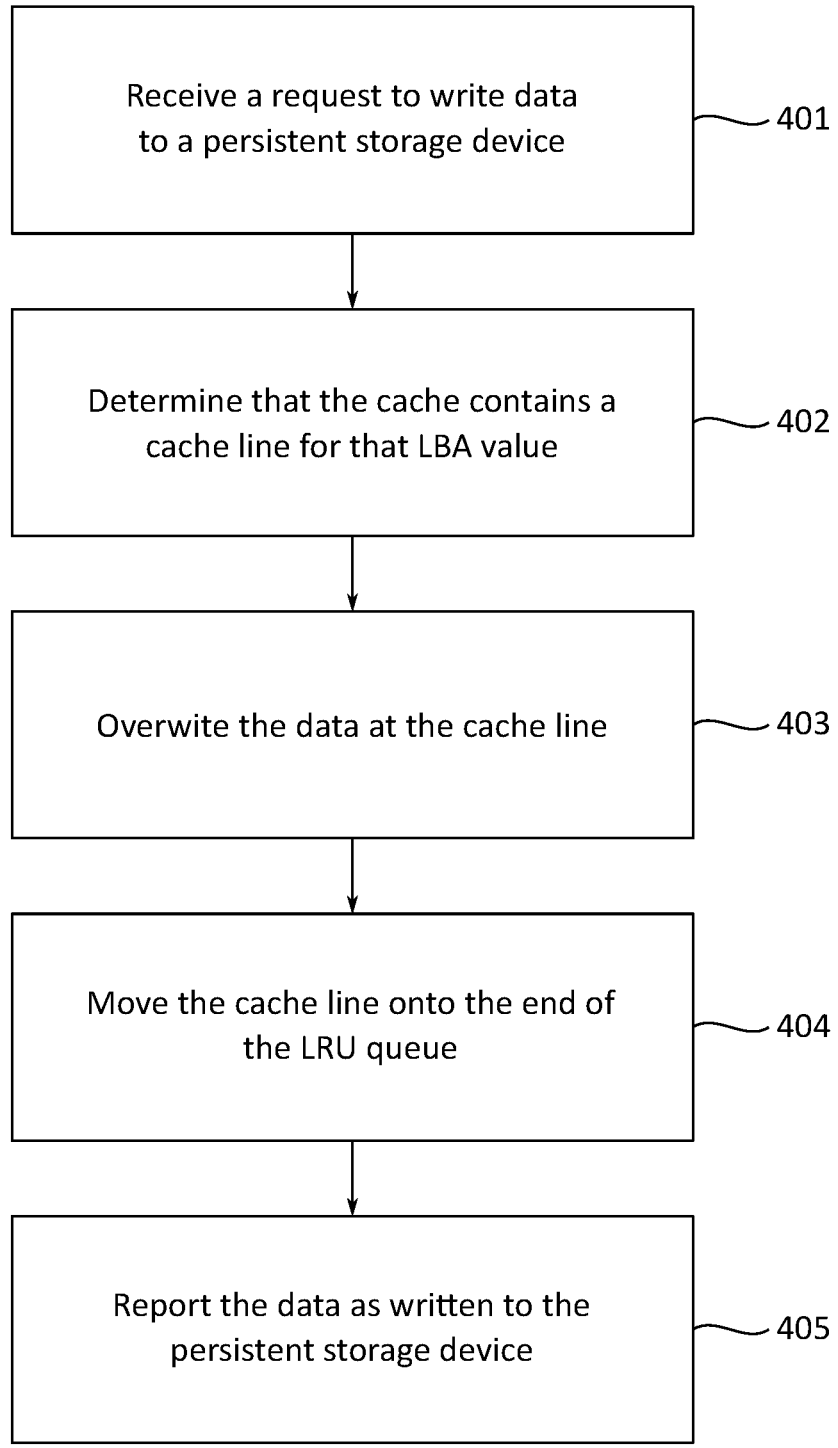
FIG. 4 shows an example approach for overwriting data in the cache.

When a request to write data is received at step 201, the request indicates an LBA value. In some cases, a subsequent request may be received which indicates that a different piece of data should be written to the same LBA value. In such cases, the approach of FIG. 4 may be used in lieu of the approach of FIG. 2.

At step 401, the storage controller receives a request to write data to a persistent storage device. This is the same as step 201.

At step 402, the storage controller determines that the cache contains a dirty cache line with data for that LBA value.

This occurs by identifying that the mapping between LBA values and cache lines includes the LBA value.

At step 403, the storage controller overwrites the previous data at that cache line to be the data of the request at step 401. This occurs even though the cache line is marked as dirty, which the storage controller would usually avoid.

At step 404, the cache line which was written to is moved to the end of an LRU queue. That is, the cache line is removed from its previous position in the LRU queue and pushed onto the end of the queue.

At step 405, after the storage controller writes the data to the cache, the storage controller reports the data as having been written to the persistent storage device. This occurs even though the data has not actually been written to the persistent storage device, but only remains as a page in the cache.

This can avoid a needless write to the persistent storage device: since the subsequent write request would have overwritten the data on the persistent storage device anyway, overwriting the data in the cache does not cause any unexpected data loss. This can reduce the total number of writes to the persistent storage device, and therefore can improve the aggregate performance of the storage system.

In addition, if a particular LBA value is written to, there is a likelihood it will be written to again. By resetting the location of the corresponding cache line in the LRU queue, this can cause a "hot" LBA to stay in cache rather than being written to persistent storage repeatedly. This can further reduce the total number of writes to the persistent storage device, and therefore can further improve the aggregate performance of the storage system.

Reading

Figure 5:
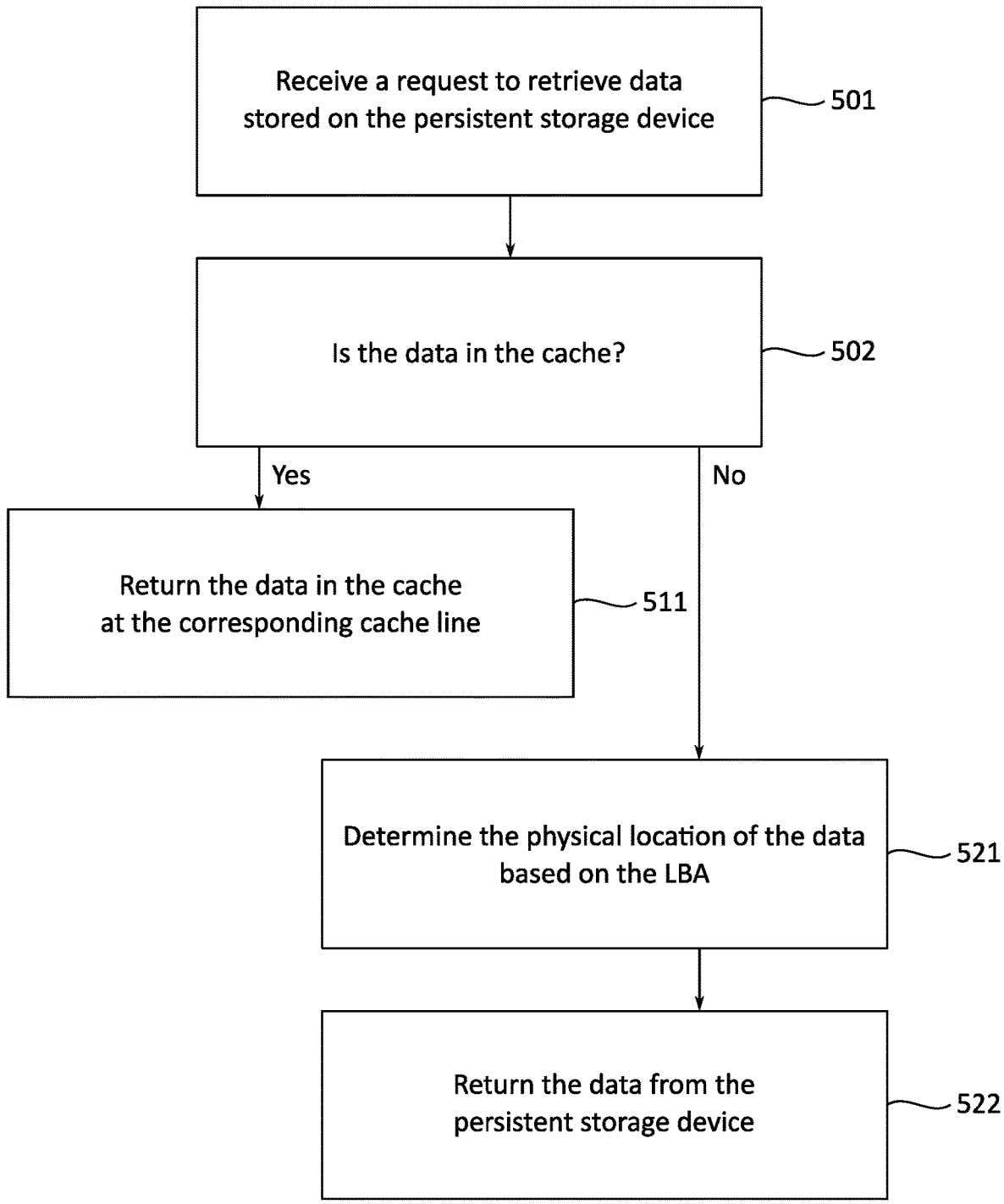
FIG. 5 shows an example approach for reading data.

The storage controller is also configured to administer reading data from the persistent storage device. FIG. 5 shows an example approach through which the storage controller can read data.

At step 501, the storage controller receives a request to retrieve data stored on the persistent storage device.

The request comprises an LBA value to indicate where the data should be read from. The request may be in the form of a read instruction from a program running on a processor, which indicates that the data should be written to a particular memory address.

At step 502, the storage controller determines if the data is in the cache.

This occurs by the storage controller checking the mapping between LBAs and cache lines. If the LBA in the request is in the mapping, then the method proceeds to step 511. If the LBA in the request is not in the mapping, then the method proceeds to step 521.

At step 511, the storage controller returns the data in the cache at the corresponding cache line.

This may occur by copying the data from the cache line to the memory address. The storage controller may then send an indication, such as an interrupt, to the program indicating the read is complete.

At step 521, the storage controller determines the physical location of the data based on the LBA.

For example, the storage controller may maintain a mapping of LBA to physical location. The physical location may be identified as a stripe and a drive. In this case, the storage controller may look up the entry for the LBA in the mapping to determine the physical location.

At step 522, the storage controller returns the data from the persistent storage device. This may occur by obtaining the data from the physical location and writing the data to the memory address. The storage controller may then send an indication, such as an interrupt, to the program indicating the read is complete.

In this way, the storage controller can selectively return data from the cache (which may be relatively fast) or from the persistent storage device (which may be relatively slow). This occurs without the program sending the request being aware of where the data is actually stored. That is, the operation of the cache is transparent to an external program.

System

Figure 6:
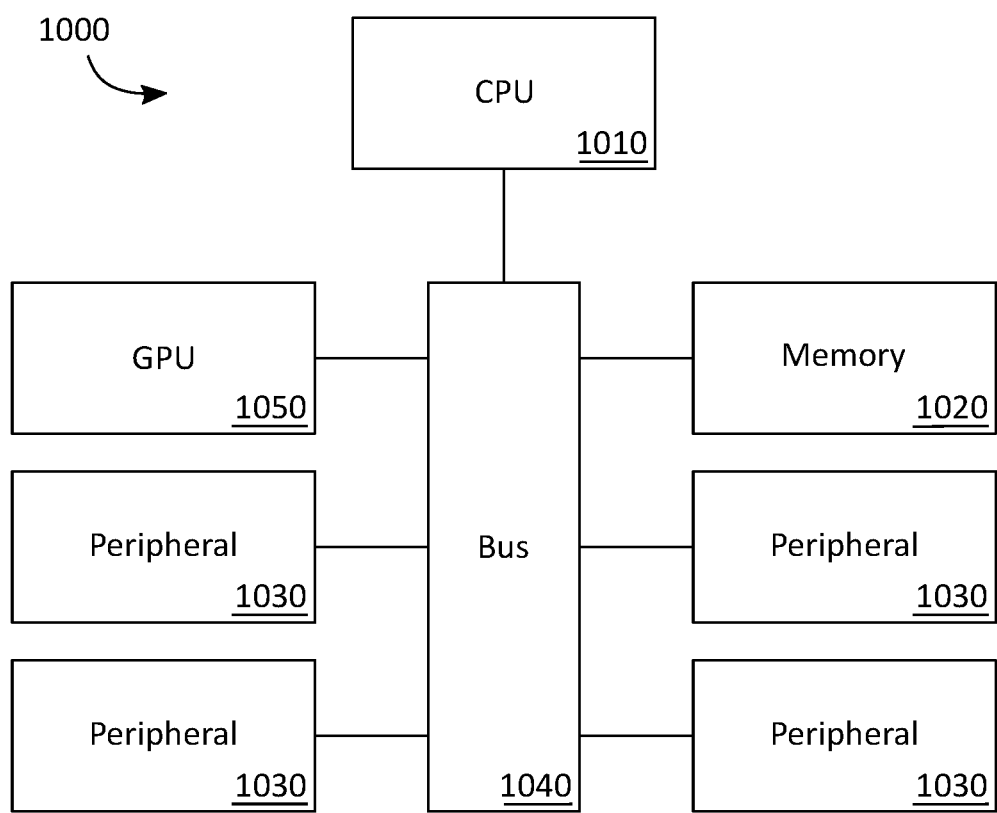
FIG. 6 shows an example system for implementing a storage controller.

FIG. 6 shows an example system which may be used to implement the example storage controller, and therefore the methods noted above.

The system 1000 comprises a CPU (central processing unit) 1010, a main memory 1020, one or more peripherals 1030, and a GPU (graphics processing unit) 1050. The CPU 1010, main memory 1020, peripherals 1030, and GPU 1050 are connected by a bus 1040. In the case of a PCIe (PCI Express) topology, the bus 1040 includes a root complex, and each of the peripherals 1030 and the GPU 1050 are PCIe endpoints. The GPU 1050 can communicate with the peripherals 1030 directly via the bus 1040. In some cases, more than one CPU 1010 and/or more than one GPU 1050 is provided.

The main memory 1020 may be configured to implement the cache, and so may comprise non-volatile memory chips.

The peripherals 1030 may include a persistent storage device (such as hard disk drives, solid state drives, or the like), storage controllers (such as RAID controllers), network controllers (such as network interface cards), switches (such as PCIe switches configured to connect further peripherals), or any of a variety of devices.

Computer system 1000 may be used to implement the methods noted above. For example, CPU 1010 and/or GPU 1050 may run a program which operates as the storage controller.

Interpretation

A number of methods have been described above. Any of these methods may be embodied in a series of instructions, which may form a computer program. These instructions, or this computer program, may be stored on a computer readable medium, which may be non-transitory. When executed, these instructions or this program cause a processor to perform the described methods.

Where an approach has been described as being implemented by a processor, this may comprise a plurality of processors. That is, at least in the case of processors, the singular should be interpreted as including the plural. Where methods comprise multiple steps, different steps or different parts of a step may be performed by different processors.

The steps of the methods have been described in a particular order for ease of understanding. However, the steps can be performed in a different order from that specified, or with steps being performed in parallel. This is the case in all methods except where one step is dependent on another having been performed.

The term "comprises" and other grammatical forms is intended to have an inclusive meaning unless otherwise noted. That is, they should be taken to mean an inclusion of the listed components, and possibly of other non-specified components or elements.

While the present invention has been explained by the description of certain embodiments, the invention is not restricted to these embodiments. It is possible to modify these embodiments without departing from the spirit or scope of the invention.

The invention claimed is:

1. A method comprising:
receiving a request to write first data to a persistent storage device, the request comprising a first logical block addressing (LBA) value;
writing the first data to a first cache line of a cache;
updating a mapping between the first LBA value and the first cache line;
receiving a subsequent request to write second data to the persistent storage device, the subsequent request comprising the first LBA value;
determining that the first LBA value exists in the mapping;
determining a dirty cache line corresponding to the first LBA value;
updating the corresponding dirty cache line to the second data of the subsequent request;
pushing the corresponding dirty cache line onto an end of a least recently used (LRU) queue of cache lines, wherein the LRU queue maintains an order in which respective cache lines were written to the LRU queue without retaining an age of each of the cache lines;
reporting the second data as having been written to the persistent storage device;
determining that third data is to be evicted from the cache;
evicting the third data from the cache;
popping a second cache line from a head of the LRU queue;
attempting to write the third data at the second cache line to the persistent storage device; and
if the write of the third data at the second cache line to the persistent storage device fails, adding the second cache line back to the head of the LRU queue for a re-attempt at eviction.

2. The method of claim 1, wherein pushing the corresponding dirty cache line onto the end of the LRU queue of cache lines comprises:
removing the first cache line corresponding to the first LBA value from the LRU queue; and
pushing the first cache line corresponding to the first LBA value onto the end of the LRU queue.

3. The method of claim 1, further comprising:
receiving a request to read fourth data from the persistent storage device;
determining that the fourth data is in the cache; and
providing the fourth data from the cache.

4. The method of claim 3, wherein the request to read the fourth data comprises a second LBA value, and wherein determining that the fourth data is in the cache comprises determining that the second LBA value is in a mapping between LBA values and cache lines.

5. The method of claim 4, wherein providing the fourth data from the cache comprises providing the fourth data from a third cache line corresponding to the second LBA value in the mapping between LBA values and cache lines.

6. The method of claim 1, further comprising marking the second cache line as clean after the third data has been successfully written to the persistent storage device.

7. The method of claim 1, wherein determining that the third data is to be evicted from the cache comprises determining that the cache is below a threshold clean capacity.

8. The method of claim 1, further comprising after writing the first data to the first cache line of the cache, marking the first cache line as dirty.

9. A system comprising:
one or more processors; and
a memory storing instructions which, when executed by the one or more processors, cause the system to:
receive a request to write first data to a persistent storage device, the request comprising a first logical block addressing (LBA) value;
write the first data to a first cache line of a cache;
update a mapping between the first LBA value and the first cache line;
receive a subsequent request to write second data to the persistent storage device, the subsequent request comprising the first LBA value;
determine that the first LBA value exists in the mapping;
determine a dirty cache line corresponding to the first LBA value;
update the corresponding dirty cache line to the second data of the subsequent request;
push the corresponding dirty cache line onto an end of a least recently used (LRU) queue of cache lines, wherein the LRU queue maintains an order in which respective cache lines were written to the LRU queue without retaining an age of each of the cache lines;
report the second data as having been written to the persistent storage device;
determine that third data is to be evicted from the cache;
evict the third data from the cache;
pop a second cache line from a head of the LRU queue;
attempt to write the third data at the second cache line to the persistent storage device; and
if the write of the third data at the second cache line to the persistent storage device fails, add the second cache line back to the head of the LRU queue for a re-attempt at eviction.

10. The system of claim 9, wherein the instructions further cause the system to:
receive a request to read fourth data from the persistent storage device;
determine that the fourth data is in the cache; and
provide the fourth data from the cache.

11. The system of claim 10, wherein the request to read the fourth data comprises a second LBA value, and wherein the instructions further cause the system to determine that the fourth data is in the cache by causing the system to determine that the second LBA value is in a mapping between LBA values and cache lines.

12. The system of claim 9, wherein the instructions further cause the system to:
mark the second cache line as clean after the third data has been successfully written to the persistent storage device.

13. The system of claim 12, wherein the instructions further cause the system to determine that the third data is to be evicted from the cache by causing the system to determine that the cache is below a threshold clean capacity.

14. A non-transitory computer readable medium storing instructions which, when executed by one or more processors, cause the one or more processors to perform steps comprising:
receiving a request to write first data to a persistent storage device, the request comprising a first logical block addressing (LBA) value;

writing the first data to a first cache line of a cache;
updating a mapping between the first LBA value and the first cache line;
receiving a subsequent request to write second data to the persistent storage device, the subsequent request comprising the first LBA value;
determining that the first LBA value exists in the mapping;
determining a dirty cache line corresponding to the first LBA value;
updating the corresponding dirty cache line to the second data of the subsequent request;
pushing the corresponding dirty cache line onto an end of a least recently used (LRU) queue of cache lines, wherein the LRU queue maintains an order in which respective cache lines were written to the LRU queue without retaining an age of each of the cache lines;
reporting the second data as having been written to the persistent storage device;
determine that third data is to be evicted from the cache;
evict the third data from the cache;
pop a second cache line from a head of the LRU queue;
attempt to write the third data at the second cache line to the persistent storage device; and
if the write of the third data at the second cache line to the persistent storage device fails, add the second cache line back to the head of the LRU queue for a re-attempt at eviction.

* * * * *